(12) United States Patent
Irie et al.

(10) Patent No.: US 8,660,685 B2
(45) Date of Patent: Feb. 25, 2014

(54) ROBOT SYSTEM AND WORKPIECE PICKING METHOD

(75) Inventors: Toshimitsu Irie, Fukuoka (JP); Yukio Hashiguchi, Fukuoka (JP); Shinji Murai, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 12/911,667

(22) Filed: Oct. 25, 2010

(65) Prior Publication Data

US 2011/0098859 A1    Apr. 28, 2011

(30) Foreign Application Priority Data

Oct. 26, 2009   (JP) .............................. P. 2009-245091
Feb. 10, 2010   (JP) .............................. P. 2010-027552

(51) Int. Cl.
    *G05B 15/00*   (2006.01)

(52) U.S. Cl.
    USPC ............................ 700/213; 700/245; 414/730

(58) Field of Classification Search
    USPC .......... 33/791, 203.12–203.21; 264/408–409, 264/411; 356/388–390, 138, 141.1–141.5, 356/152.1–155, 139.01–140, 394–401, 356/626; 187/247; 340/5.53, 5.83; 345/418, 345/501, 522; 700/1, 75–77, 83–85, 213, 700/225, 258–264, 275–280
    See application file for complete search history.

(56) References Cited

U.S. PATENT DOCUMENTS

| | | | |
|---|---|---|---|
| 4,783,108 A | | 11/1988 | Fukuyama et al. |
| 6,328,523 B1 | | 12/2001 | Watanabe et al. |
| 6,721,444 B1 | * | 4/2004 | Gu et al. ........................ 382/154 |
| 7,200,260 B1 | * | 4/2007 | Watanabe et al. ............. 382/153 |
| 7,313,464 B1 | * | 12/2007 | Perreault et al. .............. 700/245 |
| 2004/0041808 A1 | * | 3/2004 | Ban et al. ....................... 345/419 |
| 2006/0104788 A1 | * | 5/2006 | Ban et al. ....................... 414/729 |

(Continued)

FOREIGN PATENT DOCUMENTS

| | | |
|---|---|---|
| EP | 0951968 | 10/1999 |
| JP | 62-297083 | 12/1987 |

(Continued)

OTHER PUBLICATIONS

Extended European Search Report for corresponding EP Application No. 10185324.0-1239, Dec. 1, 2011.

(Continued)

*Primary Examiner* — Gene Crawford
*Assistant Examiner* — Kyle Logan
(74) *Attorney, Agent, or Firm* — Ditthavong Mori & Steiner, P.C.

(57) ABSTRACT

A robot system includes a robot. A robot control device is configured to control an operation of the robot, and includes a workpiece shape memory configure to store a shape of workpieces. A shape sensor is configured to detect shape information about the workpieces. A target workpiece detector is configured to detect a graspable workpiece based on the shape information detected by the shape sensor. A grasping information memory is configured to store a grasping position indicating which portion of the graspable workpiece is to be grasped by the robot. A grasping operation controller is configured to control the robot to grasp the graspable workpiece detected by the target workpiece detector and to pick the grasped workpiece. A disturbing operation controller is configured to control, if no graspable workpiece is detected by the target workpiece detector, the robot to perform a workpiece disturbing operation.

9 Claims, 7 Drawing Sheets

(56) References Cited

U.S. PATENT DOCUMENTS

| | | | |
|---|---|---|---|
| 2007/0012717 A1 | 1/2007 | Hanaoka et al. | |
| 2007/0239315 A1* | 10/2007 | Sato et al. | 700/245 |
| 2007/0274812 A1* | 11/2007 | Ban et al. | 414/217 |
| 2009/0173560 A1* | 7/2009 | Nakamoto et al. | 180/167 |
| 2011/0223001 A1* | 9/2011 | Martinez et al. | 414/730 |

FOREIGN PATENT DOCUMENTS

| | | |
|---|---|---|
| JP | 08-305433 | 11/1996 |
| JP | 11-300670 | 11/1999 |
| JP | 2000-263480 | 9/2000 |
| JP | 2002-200588 | 7/2002 |
| JP | 2007-021645 | 2/2007 |
| JP | 2009-128201 | 6/2009 |
| JP | 2009-172720 | 8/2009 |
| JP | 2010-005722 | 1/2010 |

OTHER PUBLICATIONS

Japanese Office Action for corresponding JP Application No. 2010-027552, Apr. 23, 2013.

* cited by examiner

ROBOT SYSTEM AND WORKPIECE PICKING METHOD

CROSS-REFERENCE TO RELATED APPLICATIONS

The present application claims priority under 35 U.S.C. §119 to Japanese Patent Application No. 2009-245091, filed Oct. 26, 2009 and to Japanese Patent Application No. 2010-027552, filed Feb. 10, 2010. The contents of these applications are incorporated herein by reference in their entirety.

BACKGROUND OF THE INVENTION

1. Field of the Invention

The present invention relates to a robot system and a workpiece picking method.

2. Description of the Related Art

Various bin-picking techniques have been proposed in recent years. In the bin-picking techniques, workpieces, such as bolts, that are identical in shape and are placed randomly (in bulk) in a bin are picked from the bin and handled. An example of such a technique is disclosed in Japanese Patent Laid-Open Publication No. 2009-128201.

In this technique, information about three-dimensional positions and orientations (three-dimensional information) within a bin is obtained before a grasping operation. At the same time, a portion of a workpiece, the portion being to be grasped by a handling device, is determined in advance. On the basis of the obtained three-dimensional information, a workpiece to be grasped is detected and a handling operation is performed.

SUMMARY OF THE INVENTION

According to one aspect of the present invention, a robot system includes a robot and a robot control device. The robot includes a grasper to grasp a workpiece in a bin containing a plurality of workpieces. The robot control device is configured to control an operation of the robot. The robot control device includes a workpiece shape memory, a shape sensor, a target workpiece detector, a grasping information memory, a grasping operation controller, and a disturbing operation controller. The workpiece shape memory is configured to store a shape of the workpieces. The shape sensor is configured to detect shape information about the workpieces in the bin. The target workpiece detector is configured to detect a graspable workpiece among the workpieces in the bin based on the shape information detected by the shape sensor. The graspable workpiece is a workpiece satisfying a condition stored in advance. The grasping information memory is configured to store a grasping position indicating which portion of the graspable workpiece is to be grasped by the robot. The grasping operation controller is configured to control the robot to grasp the graspable workpiece detected by the target workpiece detector and to pick the grasped workpiece from the bin. The disturbing operation controller is configured to control, if no graspable workpiece is detected by the target workpiece detector, the robot to perform a workpiece disturbing operation to disturb a distribution of the workpieces in the bin.

According to another aspect of the present invention, a workpiece picking method includes detecting shape information about a plurality of workpieces in a bin by using a shape sensor. A presence or absence of a graspable workpiece is detected among the plurality of workpieces based on the shape information detected by the shape sensor. The graspable workpiece is a workpiece satisfying a condition stored in advance. A robot is controlled, if no graspable workpiece is detected, to perform a workpiece disturbing operation to disturb a distribution of the workpieces in the bin. The robot is controlled, if a graspable workpiece is detected, to grasp the detected workpiece.

BRIEF DESCRIPTION OF THE DRAWINGS

The present invention will be described in further detail with reference to the accompanying drawings wherein.

DETAILED DESCRIPTION OF THE EMBODIMENTS

Figure 1:
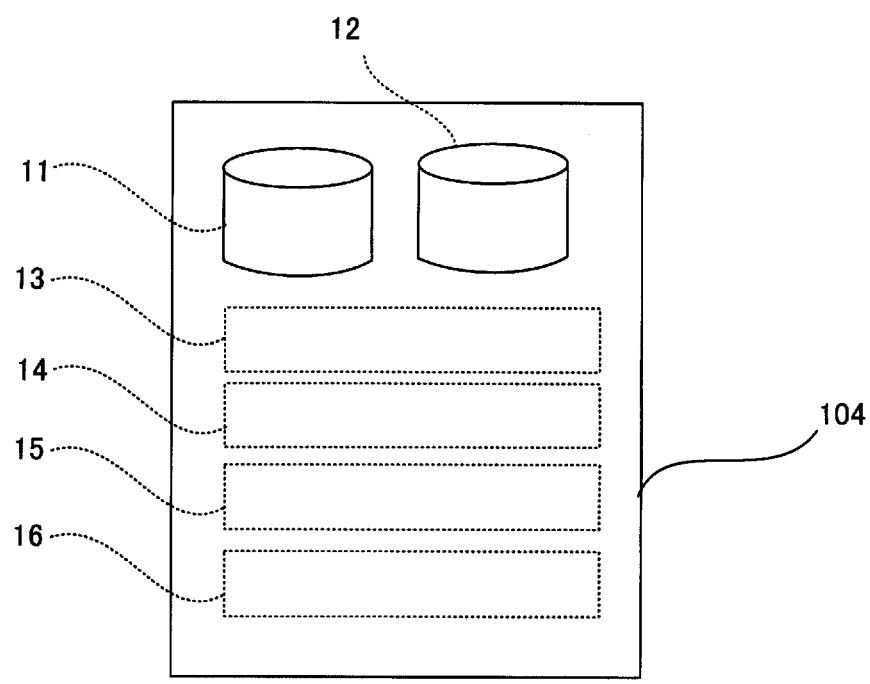
FIG. 1 is a block diagram illustrating a functional configuration of a robot control device.

The embodiments will now be described with reference to the accompanying drawings, wherein like reference numerals designate corresponding or identical elements throughout the various drawings.

First Embodiment

Figure 2:
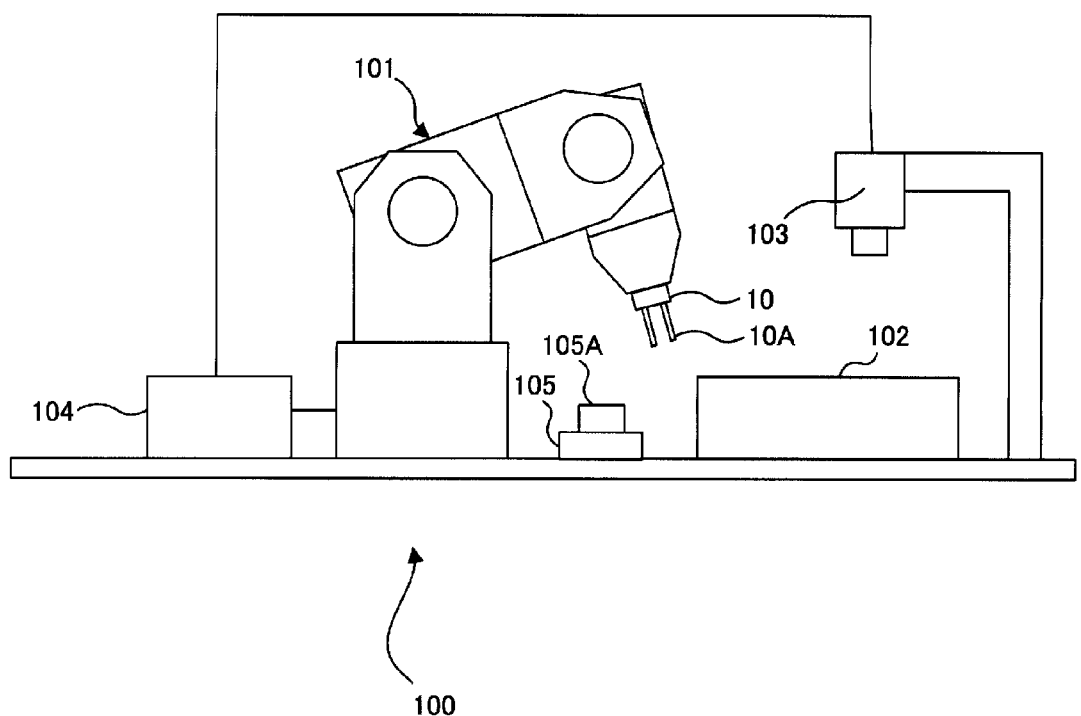
FIG. 2 schematically illustrates a general configuration of a robot system.

As illustrated in FIG. 2, a workpiece picking system (robot system) 100 includes a robot 101, a bin 102, a sensor unit (shape sensor) 103, a robot control device 104, and a conveying belt 105. The robot 101 grasps workpieces W in the bin 102 one by one and moves them to a transport rack 105A on the conveying belt 105.

The conveying belt 105 is driven toward the next process (not shown) and conveys the transport rack 105A thereon. The transport rack 105A is a container that contains workpieces W. The transport rack 105A is made of resin or the like. The workpieces W may be directly placed on the conveying belt 105, without using the transport rack 105A.

Figure 4:
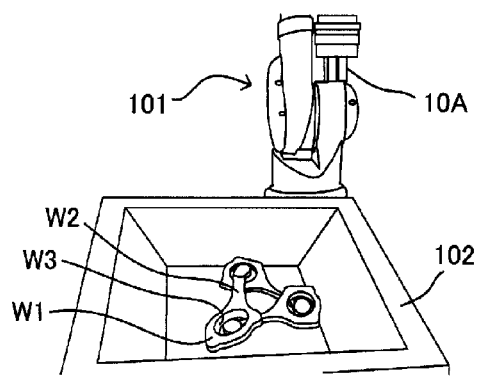
FIG. 4 is a perspective view for explaining an operation of the robot system.

As illustrated in FIG. 4, in the present embodiment, each workpiece W has a wide head portion W1 and an arm portion (rod-like portion) W2 extending from the head portion W1. The head portion W1 has a through hole (circular through hole) W3.

The robot 101 is a so-called articulated robot that is secured at its base to a fixed surface and has an arm extending from the base to the distal end. The arm of the robot 101 has a plurality of rotary joints, which are driven by a servomotor incorporated in the arm. Each of the joints is driven under the control of the robot control device 104. Note that in FIG. 2, the shape of the robot 101 is depicted schematically.

A grasping device (grasper) 10 is attached to the distal end of the arm of the robot 101. The grasping device 10 has a pair of fingers 10A that are opened and closed, that is, moved away from and close to each other by an actuator. This opening and closing of the fingers 10A is also controlled by the robot control device 104.

The grasping device 10 may be any device capable of grasping or holding a workpiece W. Examples of the grasping device 10 include a gripper having fingers that swing to hold a workpiece W, and a suction device that uses air or electromagnetic force.

The bin 102 is a box made of, for example, reinforced resin or metal. A plurality of workpieces W (i.e., objects to be detected) are placed randomly (in bulk) in the bin 102.

Figure 3:
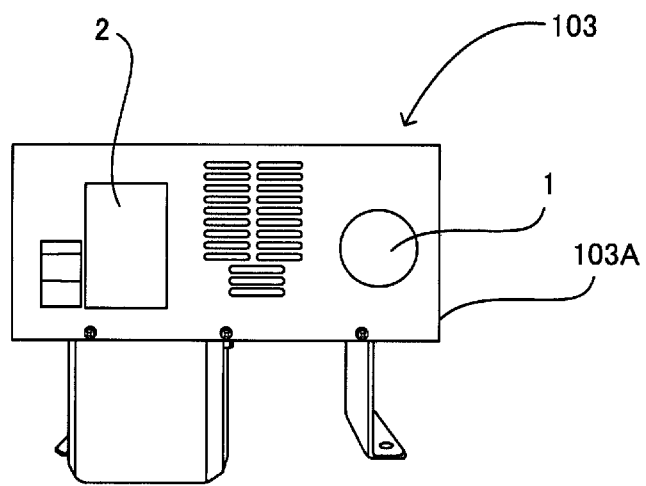
FIG. 3 is a bottom view of a sensor unit.

As illustrated in FIG. 3, the sensor unit 103 includes a camera 1 and a laser scanner (distance sensor) 2. The sensor unit 103 is disposed above the bin 102 (see FIG. 1) with the camera 1 and the laser scanner 2 oriented downward.

The laser scanner 2 illuminates a mirror with laser slit light while causing a motor to rotate the mirror. The laser scanner 2 thus illuminates objects with the laser slit light over a large area.

Then, light reflected from the objects illuminated with the laser slit light is captured by the camera 1. A distance to each object is detected based on the triangulation principle using the rotation angle of the motor, the position of an image pickup element that receives light in the camera 1, and the positional relationship of the laser, mirror, and camera 1.

A housing 103A of the sensor unit 103 includes a sensor controller having a memory device and a computing device. The camera 1 and the laser scanner 2 operate under the control of the sensor controller.

An image (pixel arrangement data) detected from above the bin 102 by the sensor unit 103 and distance information on the image are input to the robot control device 104, which is connected to the sensor controller. An operation command from the robot control device 104 is input to the sensor controller.

The robot control device 104 is a computer that includes a memory device, an electronic calculator, and an input device. The robot control device 104 is connected to the robot 101 and the grasping device 10 such that they can communicate with each other.

FIG. 1 illustrates a functional configuration of the robot control device 104. As illustrated, the robot control device 104 includes a workpiece shape memory 11, a grasping information memory 12, a target workpiece detector 13, a grasping operation controller 14, a disturbing operation controller 15, and a robot controller 16.

The workpiece shape memory 11 stores three-dimensional shape data of workpieces W measured in advance. The three-dimensional shape data stored in the workpiece shape memory 11 varies depending on the type of workpiece W.

The grasping information memory 12 stores grasping operation information including grasping position information and grasping method information. The grasping position information indicates which portion of a workpiece W is to be grasped by the grasping device 10 when the workpiece W is properly grasped. The grasping method information indicates how the workpiece W is to be grasped by the grasping device 10.

In the present embodiment, the through hole W3 of a workpiece W is stored as the grasping position information. Information stored as the grasping method information is a method in which, after the fingers 10A in a closed state are inserted into the through hole W3 of the workpiece W, the fingers 10A are opened (moved apart) to grasp the workpiece W.

The grasping information memory 12 also stores, in advance, operation information indicating that after the workpiece W is grasped, the robot 101 is operated such that the tip of the arm portion W2 of the grasped workpiece W points downward in the direction of gravity.

The grasping information memory 12 also stores, in advance, workpiece disturbing operation information for performing a workpiece disturbing operation when no properly graspable workpiece W is detected by using input device of robot control device 104.

In the present embodiment, information stored as the workpiece disturbing operation information is information about an operation in which, after the arm portion W2 of a workpiece W is grasped with the fingers 10A, the position of the grasped workpiece W is changed.

The target workpiece detector 13 detects the orientations of workpieces W in the bin 102, for example, through a matching process using three-dimensional shape information about the workpieces W and detection signals from the sensor unit 103.

Of workpieces W in the bin 102, a workpiece W that does not interfere with any other object when the fingers 10A are inserted into the through hole W3 is detected as a target workpiece W. In other words, the target workpiece W is a workpiece W having an orientation which allows the fingers 10A to grasp it and does not cause interference with any other object.

If no target workpiece W is detected, a workpiece W on which a workpiece disturbing operation can be performed is detected by the target workpiece detector 13 as a disturbing-operation target workpiece W. Specifically, if the arm portion W2 of a workpiece W is in a graspable state, the target workpiece detector 13 detects the workpiece W as a disturbing-operation target workpiece.

For a workpiece W which is the closest to the grasping device 10 of all target workpieces W detected by the target workpiece detector 13, the grasping operation controller 14 creates a path (corresponding to the operation modes of each servomotor and actuator) for operating the robot 101 and the grasping device 10, based on the grasping operation information described above. The grasping operation controller 14 then sends a command to the robot controller 16.

If no target workpiece W is detected by the target workpiece detector 13, the disturbing operation controller 15 creates, for one of disturbing-operation target workpieces W detected by the target workpiece detector 13, a path (corresponding to the operation modes of each servomotor and actuator) for operating the robot 101 and the grasping device 10, based on the workpiece disturbing operation information described above. The disturbing operation controller 15 then sends a command to the robot controller 16.

In accordance with a command from either the grasping operation controller 14 or the disturbing operation controller 15, the robot controller 16 sends an operation signal to each servomotor of the robot 101 and the actuator of the grasping device 10 to control the operation of the robot 101 and the grasping device 10. The robot controller 16 is configured to send an operation signal also to the sensor unit 103.

The workpiece picking system 100 of the present embodiment is configured as described above. The operation of the workpiece picking system 100 will now be described with reference to FIG. 4 to FIG. 11.

When workpieces W are placed in the bin 102 as illustrated in FIG. 4, the sensor unit 103 operates, in accordance with a command from the robot controller 16, to obtain an image captured from above the bin 102 and distance information on the image.

Referring to FIG. 4, a part of every workpiece W in the bin 102 is located near the through hole W3 of another workpiece W and will interfere with the fingers 10A. Thus, since no target workpiece W is detected, the target workpiece detector 13 detects any of the workpieces W in the bin 102 as a disturbing-operation target workpiece W.

Figure 5:
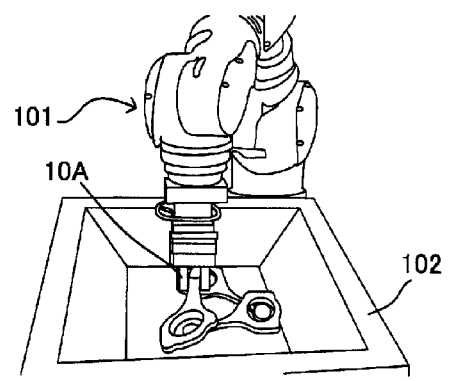
FIG. 5 is a perspective view for explaining an operation of the robot system.

Next, as illustrated in FIG. 5, the robot 101 and the fingers 10A are operated, so that the arm portion W2 of the detected disturbing-operation target workpiece W is pinched and grasped with the fingers 10A.

Figure 6:
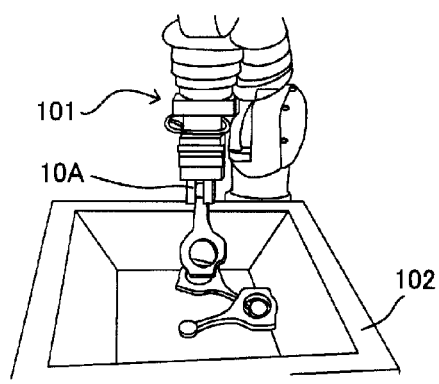
FIG. 6 is a perspective view for explaining an operation of the robot system.

Next, as illustrated in FIG. 6, the robot 101 is caused to lift the workpiece W, with the arm portion W2 grasped by the fingers 10A. During the lifting operation of the robot 101, the fingers 10A are opened to release the grasped workpiece W. Thus, the workpiece W is thrown from the fingers 10A to the bin 102 as illustrated in FIG. 7 (workpiece disturbing operation).

Figure 7:
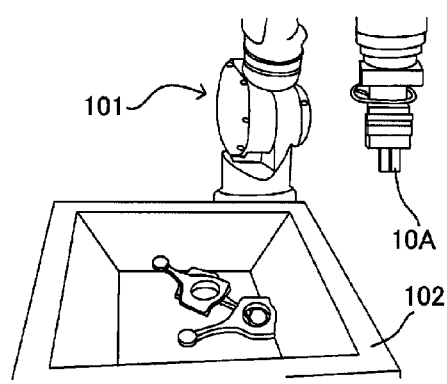
FIG. 7 is a perspective view for explaining an operation of the robot system.

In the state of FIG. 7, the sensor unit 103 is operated again to obtain an image captured from above the bin 102 and distance information on the image.

In the workpiece disturbing operation described above, the orientations of workpieces W in the bin 102 have been changed from those illustrated in FIG. 4 to those illustrated in FIG. 7. In the state of FIG. 7, a target workpiece W can be detected by the target workpiece detector 13.

If no target workpiece W is detected even in the state of FIG. 7, an additional workpiece disturbing operation is performed.

Figure 8:
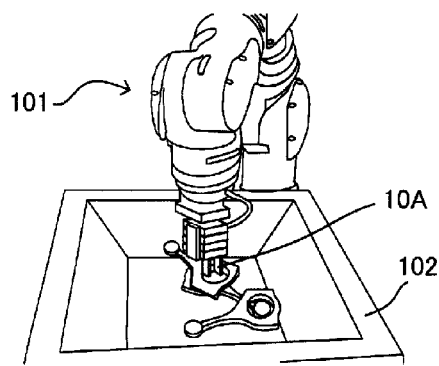
FIG. 8 is a perspective view for explaining an operation of the robot system.
Figure 9:
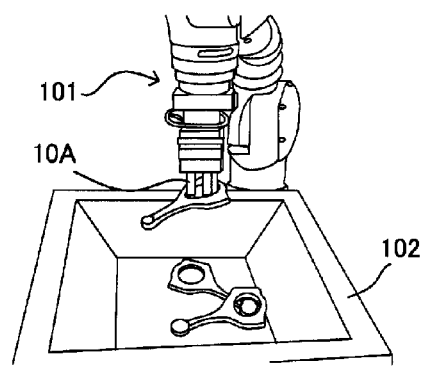
FIG. 9 is a perspective view for explaining an operation of the robot system.

If a target workpiece W is detected in the state of FIG. 7, the fingers 10A in a closed state are inserted into the through hole W3 of the target workpiece W as illustrated in FIG. 8. Then, as illustrated in FIG. 9, the fingers 10A inserted into the through hole W3 are opened (moved apart) to grasp the workpiece W, which is lifted by the operation of the robot 101.

Figure 10:
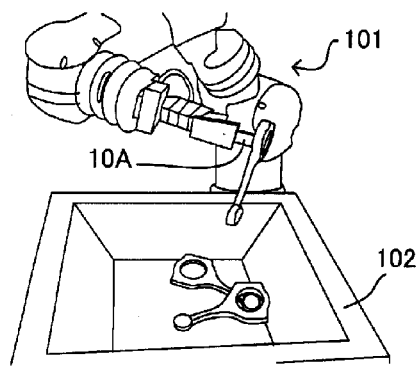
FIG. 10 is a perspective view for explaining an operation of the robot system.

Then, as illustrated in FIG. 10, the robot 101 is operated such that the tip of the arm portion W2 of the grasped workpiece W points downward in the direction of gravity. Thus, even if the arm portion W2 of the grasped workpiece W is engaged in the through hole W3 of a different workpiece W, the different workpiece W can be disengaged from the grasped workpiece W. Therefore, it is possible to prevent that a plurality of workpieces W are picked at the same time.

Figure 11:
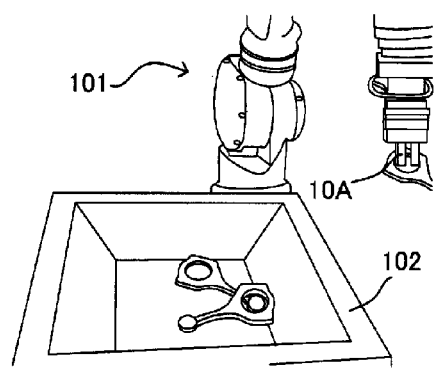
FIG. 11 is a perspective view for explaining an operation of the robot system.
Figure 12:
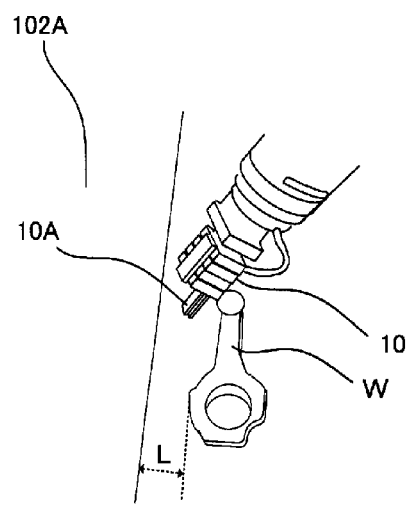
FIG. 12 is a perspective view for explaining an operation of the robot system.

After stopping for a predetermined period of time (e.g., one second) in the state of FIG. 10, the robot 101 operates to transfer the grasped workpiece W toward the transport rack 105A as illustrated in FIG. 11.

In the workpiece picking system 100 of the present embodiment, based on a result of detection performed by the sensor unit 103, the target workpiece detector 13 detects the presence or absence of a workpiece W on which a grasping operation can be performed. If there is no workpiece (target workpiece) W on which a grasping operation can be performed, a grasping operation is not performed. Therefore, it is possible to avoid failure caused by a grasping operation performed even when there is no properly graspable workpiece W.

When there is no target workpiece W, the arm portion W2 of any workpiece W detected as a disturbing-operation target workpiece W is grasped and released to disturb the distribution of workpieces W in the bin 102. Thus, after it becomes possible to perform a grasping operation, a workpiece W in the bin 102 can be properly grasped.

Since a disturbing operation is performed on one of detected disturbing-operation target workpieces W, the orientation of at least the workpiece W grasped and released by the fingers 10A in the disturbing operation is highly likely to be changed to a graspable orientation. Therefore, as compared to the case where workpieces W in the bin 102 are disturbed by a random operation, the orientation of one or more workpieces W in the bin 102 can be more reliably changed to a graspable orientation by a smaller motion.

Second Embodiment

A second embodiment will now be described. The second embodiment is the same as the first embodiment except that a plurality of different types of workpiece disturbing operations are additionally provided. Components that overlap those of the first embodiment will not be described here, and are given the same reference numerals.

In the first embodiment described above, the grasping information memory 12 stores, in advance, information about a workpiece disturbing operation that grasps and releases the arm portion W2 of a workpiece W (hereinafter referred to as a first disturbing operation) and a condition (workpiece condition) for performing the first disturbing operation. In addition to this, in the second embodiment, the grasping information memory 12 stores, in advance, information about three workpiece disturbing operations (hereinafter referred to as second to fourth disturbing operations) and conditions (workpiece conditions) for performing the respective disturbing operations.

The second disturbing operation is an operation of grasping and releasing the head portion W1 of a workpiece W with the grasping device 10. The workpiece condition for performing the second disturbing operation is that the workpiece W is in an orientation which does not cause interference between any graspable portion of the head portion W1 and either the grasping device 10 or the arm of the robot 101.

Figure 13:
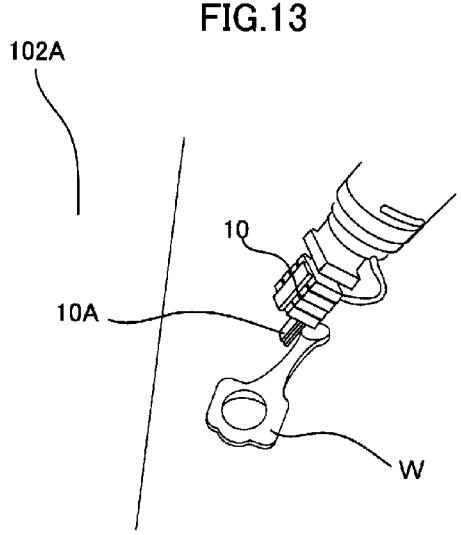
FIG. 13 is a perspective view for explaining an operation of the robot system.

The third disturbing operation is, as illustrated in FIG. 13, an operation of pulling a workpiece W away from an inner wall 102A of the bin 102. The workpiece condition for performing the third disturbing operation is that there is a space between the workpiece W and its surrounding obstacle (which is the inner wall 102A here) for the fingers 10A in a closed state to pass through.

In the third disturbing operation, to prevent interference between the inner wall 102A of the bin 102 and either the arm of the robot 101 or the grasping device 10, the fingers 10A enter the bin 102 at an angle from the center of the bin 102 to reach the workpiece W, which is then pulled away from the inner wall 102A.

Figure 14:
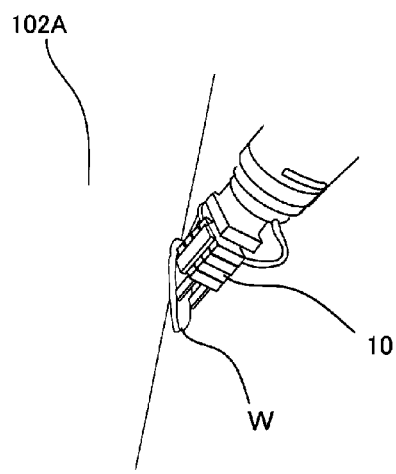
FIG. 14 is a perspective view for explaining an operation of the robot system.
Figure 15:
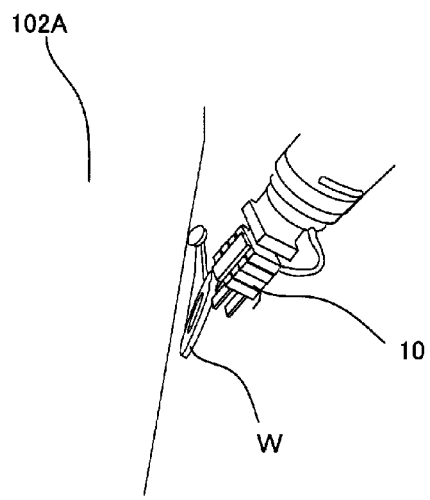
FIG. 15 is a perspective view for explaining an operation of the robot system.

The workpiece condition for performing the fourth disturbing operation is that a workpiece W leans against the inner wall 102A of the bin 102 as illustrated in FIG. 14, or that a distance between the inner wall 102A and the workpiece W is smaller than a predetermined value. As illustrated in FIG. 15, the fourth disturbing operation is an operation of causing the workpiece W to fall toward the center of the bin 102.

Figure 16:
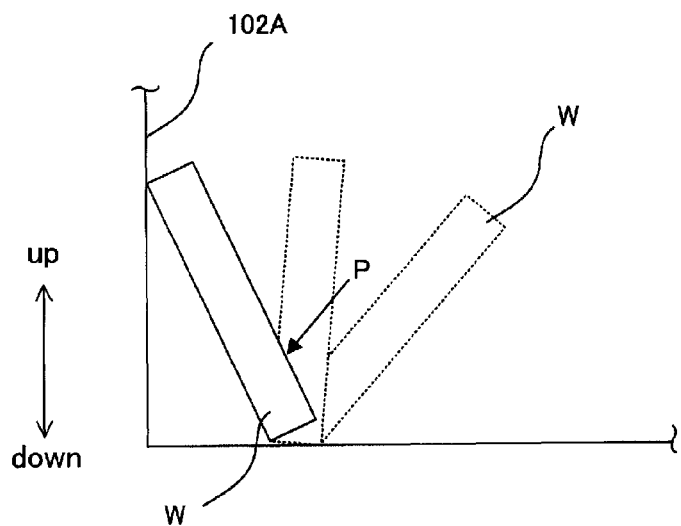
FIG. 16 is a schematic elevation view for explaining an operation of the robot system.

More specifically, as illustrated in FIG. 16, the fingers 10A are brought into contact with the workpiece W leaning against the inner wall 102A at a position below the center of gravity of the workpiece W, in the direction of arrow P. Thus, as indicated by dotted lines in FIG. 16, the workpiece W is caused to fall toward the center of the bin 102, for example, by reactive force of the inner wall 102A.

In the present embodiment, the order of priority of the disturbing operations is as follows: the first disturbing operation, the second disturbing operation, the third disturbing operation, and the fourth disturbing operation. If it is possible to perform the first disturbing operation, the first disturbing operation is performed. If the condition for performing the first disturbing operation is not satisfied, a determination is made as to whether the condition for performing the second disturbing operation is satisfied. If the condition for performing the second disturbing operation is satisfied, the second disturbing operation is performed. If the condition for performing the second disturbing operation is not satisfied, a determination is made as to whether the condition for performing the third disturbing operation is satisfied. If the condition for performing the third disturbing operation is satisfied, the third disturbing operation is performed. If the condition for performing the third disturbing operation is not satisfied, a determination is made as to whether the condition for performing the fourth disturbing operation is satisfied. If the condition for performing the fourth disturbing operation is satisfied, the fourth disturbing operation is performed. If the condition for performing the fourth disturbing operation is not satisfied, the workpiece picking operation is stopped based on the assumption that there is no graspable workpiece W in the bin 102.

Instead of stopping the workpiece picking operation, the workpiece picking system 100 may display an error message on a display of the robot control device 104.

In the first embodiment described above, if both the grasping operation and the first disturbing operation cannot be performed on any workpiece W, the workpiece picking system 100 may not be able to accurately handle workpieces W. However, the workpiece picking system 100 of the second embodiment provides not only the first disturbing operation, but also the second to fourth disturbing operations. Therefore, even if both the grasping operation and the first disturbing operation cannot be performed on any workpiece W, execution of a grasping operation is made possible by performing any of the second to fourth disturbing operations. It is thus possible to avoid inconvenience, such as failure in handling workpieces W.

In the second disturbing operation, when a workpiece W is in an orientation which does not allow the fingers 10A to be fully inserted into the through hole W3 and does not allow the arm portion W2 to be firmly grasped, the head portion W1 of the workpiece W is grasped and released. This can change the positions and orientations of a plurality of workpieces W in the bin 102 and make it possible to perform a grasping operation on one or more workpieces W.

When, for example, the number of workpieces W remaining in the bin 102 becomes small during a workpiece grasping operation, the arm of the robot 101 or the grasping device 10 may interfere with the inner wall 102A of the bin 102. In such a case, in the third disturbing operation, the grasping device 10 is brought close to a workpiece W from an angle which does not cause interference (contact) with the inner wall 102A, and then the grasping device 10 pulls the workpiece W away from the inner wall 102A. Since the workpiece W thus becomes distant from the inner wall 102A, a more reliable workpiece grasping operation can be performed next time.

In the fourth disturbing operation, when a workpiece W leans against the inner wall 102A of the bin 102, the workpiece W is caused to fall from the inner wall 102A toward the center of the bin 102. Therefore, a more reliable workpiece grasping operation can be performed next time.

Modifications

A modification of the first and second embodiments will now be described. The present modification is realized by modifying the functional configuration of the robot control device 104 and the sensor controller of the first or second embodiment described above.

Figure 17:
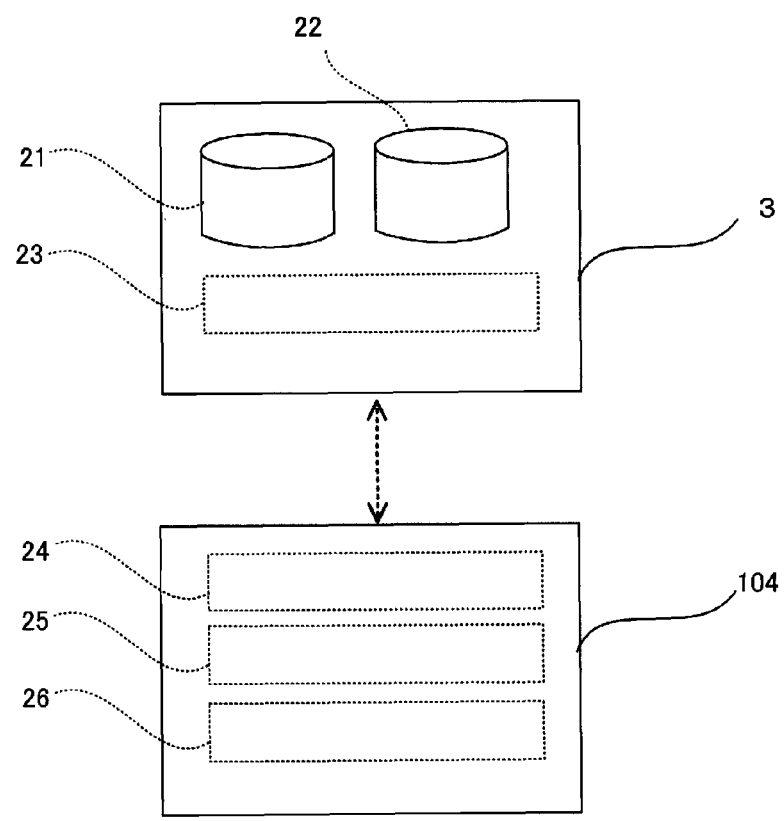
FIG. 17 is a block diagram illustrating a modification of embodiments.

Specifically, as illustrated in FIG. 17, the sensor controller 3 in the sensor unit 103 includes a workpiece shape memory 21, a grasping information memory 22, and a target workpiece detector 23. Also, as illustrated in FIG. 17, the robot control device 104 includes a grasping operation controller 24, a disturbing operation controller 25, and a robot controller 26.

The sensor controller 3 is connected to an input device, such as an external personal computer (PC). Thus, three-dimensional shape data of workpieces W measured in advance, and grasping operation information including grasping position information and grasping method information are input to the sensor controller 3 and stored in the workpiece shape memory 21 and the grasping information memory 22. Note that the grasping position information is information about which portion of a workpiece W is to be grasped by the grasping device 10, and the grasping method information is information about how the workpiece W is to be grasped by the grasping device 10.

The target workpiece detector 23 detects the orientations of workpieces W in the bin 102, for example, through a matching process using detection signals from the camera 1 and the laser scanner 2. Then, the target workpiece detector 23 detects a target workpiece W that satisfies a predetermined condition, and sends the position and orientation information about the detected target workpiece W to the robot control device 104.

If no target workpiece W is detected, the target workpiece detector 23 detects a workpiece W on which a workpiece disturbing operation can be performed as a disturbing-operation target workpiece W. Then, the target workpiece detector 23 sends the position and orientation information about the detected disturbing-operation target workpiece W to the robot control device 104.

The robot control device 104 illustrated in FIG. 1 is provided as an integral computing device. However, the robot control device 104 may be provided in combination with another computing device as illustrated in FIG. 17.

Some embodiments of the present invention have been described above. The workpiece picking system of the present invention is not limited to the foregoing embodiments, and may be appropriately modified without departing from the scope of the present invention.

For example, in the first embodiment, a disturbing-operation target workpiece to be used in a disturbing operation is detected when no graspable workpiece (target workpiece) is detected. However, the mode of disturbing operation may be selected appropriately. When workpieces and the grasping device are relatively resistant to shocks and if no graspable workpiece (target workpiece) is detected, the grasping device may be inserted into the bin through a predetermined path and may stir the workpieces in the bin. This makes it possible that a disturbing operation be done through a simpler calculation process.

In the second embodiment, one of the plurality of workpiece disturbing operations is performed depending on the condition. However, the number of types of workpiece disturbing operations may be either one or more.

Also in the second embodiment, the first disturbing operation involves grasping and releasing the arm portion of a workpiece, and the second workpiece disturbing operation involves grasping and releasing the head portion of a workpiece. However, such a distinction may be removed. That is, a workpiece having any graspable portion may be detected as a disturbing-operation target workpiece.

The shape of workpieces is not limited to that described in the embodiments. The embodiments of the present invention can be applied to workpieces of any shape by setting a workpiece disturbing operation appropriate for the shape.

Although the shape sensor is disposed near the bin in the embodiments described above, the shape sensor may be mounted on the robot. In this case, the detectable range of the shape sensor can be changed by appropriately operating the robot.

Obviously, numerous modifications and variations of the present invention are possible in light of the above teachings. It is therefore to be understood that within the scope of the appended claims, the invention may be practiced otherwise than as specifically described herein.

What is claimed is:

1. A robot system comprising:
a robot comprising a grasper to grasp a workpiece in a bin containing a plurality of workpieces; and
a robot control device configured to control an operation of the robot, the robot control device comprising:
a workpiece shape memory configured to store a shape of the workpieces, each of the workpieces having a head portion and a rod-like portion, the head portion having a circular through hole having an inner diameter larger than an outer diameter of the rod-like portion, the rod-like portion extending in one direction from the head portion;
a shape sensor configured to detect shape information about the workpieces in the bin;
a target workpiece detector configured to detect a graspable workpiece among the workpieces in the bin based on the shape information detected by the shape sensor, the graspable workpiece being a workpiece satisfying a condition stored in advance;
a grasping information memory configured to store a grasping position indicating which portion of the graspable workpiece is to be grasped by the robot;
a grasping operation controller configured to control the robot to grasp the graspable workpiece detected by the target workpiece detector and to pick the grasped workpiece from the bin; and
a disturbing operation controller configured to control, if no graspable workpiece is detected by the target workpiece detector, the robot to perform a workpiece disturbing operation to disturb a distribution of the workpieces in the bin,
wherein the grasping operation controller is configured to insert the grasper of the robot into the through hole of the graspable workpiece, and is configured to widen the grasper to grasp the graspable workpiece,
wherein the grasping operation controller is configured to operate the robot such that, after the robot grasps the graspable workpiece, a tip of the rod-like portion of the graspable workpiece grasped by the robot points downward in a direction of gravity,
wherein the grasping information memory stores operation information about a plurality of different types of workpiece disturbing operations in advance, and
wherein the disturbing operation controller is configured to perform one of the plurality of different types of workpiece disturbing operations based on a predetermined order of priority of the workpiece disturbing operations, the one of the plurality of different types of workpiece disturbing operations satisfying a predetermined workpiece condition.

2. The robot system according to claim 1, wherein based on shape information detected again by the shape sensor after the workpiece disturbing operation, the target workpiece detector is configured to detect a graspable workpiece from the workpieces in the bin, the graspable workpiece being a workpiece satisfying the condition stored in advance.

3. The robot system according to claim 1, wherein the shape sensor comprises
a camera configured to capture an image of the bin, and
a distance sensor configured to detect distance information about the workpieces in the bin.

4. The robot system according to claim 1,
wherein the grasping information memory stores, in advance, operation information for performing the workpiece disturbing operation, and
wherein the disturbing operation controller is configured to perform the workpiece disturbing operation based on the operation information if no graspable workpiece is detected by the target workpiece detector.

5. The robot system according to claim 1, wherein the operation information about the plurality of different types of workpiece disturbing operations include information about an operation to pull a workpiece away from an inner wall of the bin.

6. The robot system according to claim 1, wherein the operation information about the plurality of different types of workpiece disturbing operations include information about an operation to control a workpiece to fall from an inner wall of the bin toward a center of the bin, the operation being performed when the predetermined workpiece condition is that the workpiece leans against the inner wall of the bin.

7. The robot system according to claim 1, further comprising:
the bin containing a plurality of workpieces; and
the shape sensor configured to detect shape information about the workpieces in the bin.

8. A workpiece picking method comprising:
detecting shape information about a plurality of workpieces in a bin, each of the workpieces having a head portion and a rod-like portion, the head portion having a circular through hole having an inner diameter larger than an outer diameter of the rod-like portion, the rod-like portion extending in one direction from the head portion;
detecting a presence or absence of a graspable workpiece among the plurality of workpieces based on the shape information detected, the graspable workpiece being a workpiece satisfying a condition stored in advance;
controlling, if no graspable workpiece is detected, a robot to perform a workpiece disturbing operation to disturb a distribution of the workpieces in the bin, the workpiece disturbing operation being selected from a plurality of different types of workpiece disturbing operations stored in advance, the workpiece disturbing operation being selected from the plurality of different types of workpiece disturbing operations based on a predetermined order of priority of the workpiece disturbing operations, the selected workpiece disturbing operation satisfying a predetermined workpiece condition;
controlling, if a graspable workpiece is detected, the robot to grasp the detected workpiece, the controlling of the robot to grasp the detected workpiece including inserting a grasper of the robot into the through hole of the detected workpiece and widening the grasper to grasp the detected workpiece; and operating the robot such that, after the robot grasps the detected workpiece, a tip of the rod-like portion of the detected workpiece grasped by the robot points downward in a direction of gravity.

9. The workpiece picking method according to claim 8, further comprising:

detecting, after the workpiece disturbing operation, shape information about the workpieces in the bin again;

controlling, if no graspable workpiece is detected, the robot to perform an additional workpiece disturbing operation to disturb a distribution of the workpieces in the bin; and controlling, if a graspable workpiece is detected, the robot to grasp the detected workpiece.

* * * * *